(12) United States Patent
Kavli et al.

(10) Patent No.: US 9,189,911 B2
(45) Date of Patent: Nov. 17, 2015

(54) METHOD AND APPARATUS FOR DETECTING FRAUD ATTEMPTS IN REVERSE VENDING MACHINES

(75) Inventors: Tom Øystein Kavli, Nittedal (NO); Johnny Njåstad, Oslo (NO); Geir Sæther, Asker (NO)

(73) Assignee: TOMRA SYSTEMS ASA, Asker (NO)

( * ) Notice: Subject to any disclaimer, the term of this patent is extended or adjusted under 35 U.S.C. 154(b) by 143 days.

(21) Appl. No.: 14/128,767

(22) PCT Filed: Jun. 22, 2012

(86) PCT No.: PCT/NO2012/050119
§ 371 (c)(1),
(2), (4) Date: Feb. 6, 2014

(87) PCT Pub. No.: WO2012/177149
PCT Pub. Date: Dec. 27, 2012

(65) Prior Publication Data
US 2014/0147005 A1  May 29, 2014

(30) Foreign Application Priority Data
Jun. 24, 2011 (EP) .................................... 11171368

(51) Int. Cl.
*G06T 7/00* (2006.01)
*G06F 7/00* (2006.01)
*G06F 7/06* (2006.01)
(Continued)

(52) U.S. Cl.
CPC ................ *G07F 7/06* (2013.01); *G06T 7/0002* (2013.01); *G06T 7/0004* (2013.01); *G07F 7/00* (2013.01); *G07F 7/0609* (2013.01)

(58) Field of Classification Search
CPC ....... G06T 7/0002; G06T 7/0004; G07F 7/00; G07F 7/06
See application file for complete search history.

(56) References Cited

U.S. PATENT DOCUMENTS

| | | | |
|---|---|---|---|
| 5,898,169 A | 4/1999 | Nordbryhn | |
| 6,137,900 A * | 10/2000 | Steidel et al. | 382/142 |
| 7,422,147 B2 * | 9/2008 | Rosenbaum | 235/383 |

(Continued)

FOREIGN PATENT DOCUMENTS

| | | |
|---|---|---|
| DE | 10063368 A1 | 6/2002 |
| EP | 2219159 A1 | 8/2010 |

(Continued)

OTHER PUBLICATIONS

International Search Report (PCT/ISA/210) mailed on Aug. 3, 2012, by the European Patent Office as the International Searching Authority for International Application No. PCT/NO2012/050119.

(Continued)

*Primary Examiner* — Utpal Shah
(74) *Attorney, Agent, or Firm* — Buchanan Ingersoll & Rooney P.C.

(57) ABSTRACT

A reverse vending machine, including: a chamber adapted to receive an object returned to the reverse vending machine; a plurality of cameras arranged around the perimeter of the chamber for viewing said object; a transparent or translucent plate arranged such that the cameras in use view the object obliquely through the transparent or translucent plate; and means adapted to couple light into the plate such that the light undergoes total internal reflection in the plate. Also, a method of detecting dirt in a reverse vending machine.

28 Claims, 9 Drawing Sheets

(51) Int. Cl.
  *G07F 7/06* (2006.01)
  *G07F 7/00* (2006.01)

(56) References Cited

U.S. PATENT DOCUMENTS

| | | | |
|---|---|---|---|
| 7,633,614 B2 | 12/2009 | Haugholt et al. | |
| 7,881,965 B2* | 2/2011 | Bowles et al. | 705/14.37 |
| 2006/0244948 A1* | 11/2006 | Overbeck | 356/71 |
| 2006/0257005 A1* | 11/2006 | Bergeron et al. | 382/103 |
| 2007/0292117 A1* | 12/2007 | Saether et al. | 396/20 |
| 2008/0025826 A1 | 1/2008 | Saether | |
| 2008/0027581 A1 | 1/2008 | Saether et al. | |
| 2009/0120847 A1 | 5/2009 | Saether et al. | |
| 2010/0026807 A1 | 2/2010 | Saether et al. | |
| 2011/0090485 A1* | 4/2011 | Cronin et al. | 356/71 |
| 2013/0182002 A1* | 7/2013 | Macciola et al. | 345/589 |

FOREIGN PATENT DOCUMENTS

| | | |
|---|---|---|
| WO | WO 98/02256 A1 | 1/1998 |
| WO | WO 2005/069233 A1 | 7/2005 |
| WO | WO 2006/080851 A2 | 8/2006 |

OTHER PUBLICATIONS

International Preliminary Report on Patentability (PCT/IPEA/409) mailed on Oct. 17, 2013, by the European Patent Office as the International Searching Authority for International Application No. PCT/NO2012/050119.

Office Action (Patent Examination Report No. 1) issued on May 18, 2015, by the Australian Patent Office in corresponding Australian Patent Application No. 2012273536. (2 pages).

* cited by examiner

METHOD AND APPARATUS FOR DETECTING FRAUD ATTEMPTS IN REVERSE VENDING MACHINES

FIELD OF USE

The present invention relates to reverse vending machines, and in particular to fraud detection in reverse vending machines.

BACKGROUND

Systems for recycling of returnable containers, for example beverage containers, have been in place for many years as a means to prevent littering and conserve resources. Such systems were originally based on manual handling of returned containers by vendors, but the process has been made more efficient by the introduction of reverse vending machines which were able to accept empty containers, verify the authenticity of the container, and issue a receipt that can be exchanged for cash or used as payment in the store where the reverse vending machine is located.

Over the years reverse vending machines have been made more efficient and sophisticated. They are now typically able to handle a wide range of containers made from various materials, most often glass, PET (polyethylene terephthalate), steel and aluminum. A reverse vending machine is typically able to receive the containers, validate them based on shape and other physical characteristics as well as bar codes and other markings, and sort them based on material or type. Some machines are able to store reusable containers while containers that are only recycled for their material are crushed and stored separately. A reverse vending machine should be able to reject non-returnable containers, detect and handle fraud attempts and assign the proper deposit return value to a wide range of containers. At the same time a machine must be reliable and regular maintenance should not be work intensive or require frequent replacement of parts.

Consequently, there is a need for constant improvement of reverse vending machines in order to meet these challenges as well as new challenges resulting from for example introduction of new types of returnable containers, and more sophisticated fraud attempts.

SUMMARY

The invention relates to methods and apparatuses for detecting fraud attempts in reverse vending machines. The invention uses feature detection in images and optionally data from other sensors to detect inconsistencies relative to the expected behavior and appearance of a returned item inside a reverse vending machine. In particular the invention applies two different feature extraction algorithms to image data and sensor data in order to detect inconsistent positions of objects inside the reverse vending machine. In the various embodiments of the invention the two different feature extraction algorithms or methods may extract features that are representative of or associated with the same object two different objects. The feature extraction algorithms may also be applied to data obtained from the same sensor or from different sensors and at the same point in time or at different points in time.

Accordingly, in a first aspect of the invention a method is provided. In order to perform the method, a reverse vending machine may comprise at least one image sensor and at least one data processing unit. The at least one image sensor may be used to obtain a set of one or more images of a returned item inserted into the reverse vending machine. At least one data processing unit may then apply a first feature extraction algorithm to extract a first feature from at least a first subset of the set of one or more images and a second feature extraction algorithm to extract a second feature from at least a second subset of the set of one or more images. Alternatively the second feature extraction algorithm can be applied to data received from an additional sensor. Using the data processing unit, it may then be determined whether a position or a motion of said first feature is inconsistent with a position or motion of said second feature.

In embodiments using additional sensors that are not image sensors, the second feature extraction algorithm may be applied to data received from an ultrasonic sensing device included in the reverse vending machine. Another alternative is to use a laser ranging device included in the reverse vending machine.

In some embodiments of the invention, the set of one or more images includes at least two images obtained at least two different points in time, for example in order to detect inconsistent motion over time.

In one embodiment, the first feature extraction algorithm is used to extract a feature from an image obtained at a first point in time, the feature being indicative of a relative position of an object at said first point in time, and the second feature extraction algorithm is used to extract a feature from an image obtained at a second point in time, the feature being indicative of a relative position of said object at said second point in time. The determining may then include estimating a velocity of the object based on the relative positions and the time interval between the first and the second point in time, and comparing the estimated velocity with an expected velocity. It should be noted that according to this embodiment, while the feature extraction algorithms and the extracted features are not the same, they are assumed to be associated with the same object inside the reverse vending machine.

The expected velocity in this embodiment may be any velocity which is positive relative to the direction a returnable item normally travels through the reverse vending machine, and the determining may indicate inconsistent motion if the estimated velocity is a velocity which is negative relative to the direction a returnable item normally travels through the reverse vending machine.

Alternatively, the expected velocity may be based on the velocity at which a conveyor arranged to transport returned items through the reverse vending machine is operating, and the determining may indicate inconsistent motion if the estimated velocity is substantially different from the expected velocity.

According to yet another alternative, the expected velocity is based on a determined estimated velocity resulting from the application of the first feature extraction, the second feature extraction and the determining on a previous set of images, and the method may then further comprise using the result of the determining to update the expected velocity prior to the application of the first feature extraction, the second feature extraction and the determining on a subsequent set of images.

According to one embodiment of the invention, the first feature extraction algorithm includes applying edge detection along two axes and, based on the edge detection, identifying a region of interest in said first image. The second feature extraction algorithm may then include searching for a region in the second image which is highly correlated with said region of interest in the first image. The invention does not require that the second extraction algorithm is applied to and image that has been obtained after the first image, and instead the second image may have been obtained at a previous point in time.

According to an alternative embodiment, the first feature extraction algorithm is used to extract a first feature indicative of a relative position of a first object associated with the first feature from at least two images obtained at least two different points in time. The second feature extraction algorithms is then used to extract a second feature indicative of a relative position of a second object associated with the second feature from at least two images obtained at least two different points in time. The determining may then include estimating relative velocities for the first and the second object based on the relative positions and time intervals between the different points in time, and indicating an inconsistent motion of the first object relative to the second object if there is a substantial difference between said first and said second estimated velocity.

Such a determination may for example indicate that an object that should be attached to the returnable item is instead moving independently of the returnable item inside the reverse vending machine. For example, the first feature extraction algorithm can be applied to images obtained from a first image sensor which is part of a barcode reader and the second feature extraction algorithm can be applied to images obtained from a second image sensor which is part of a shape detection camera. The first feature will then be an image feature which is representative of a barcode and the second feature is representative of a shape of a returned item.

In yet another embodiment, the first feature extraction algorithm includes detecting the presence and position of a thin object in at least one image from the first subset of images and the second feature extraction algorithm includes detecting a position of a returned item from at least one image from the second subset of images or from other sensor data. The determining may then include comparing the position of the detected thin object relative to the position of the returned item.

According to this embodiment, detecting the presence and position of a thin object may include using a foreground-background segmentation method to generate a processed image, classifying each pixel in the processed image as either an object pixel or a background pixel, and classifying each object pixel as either "normal" or "thin". The foreground-background segmentation method may for example include dividing a current image by a reference image.

According to another embodiment, the first feature extraction algorithm includes detecting the presence and position of at least one characteristic feature of the shape of a returned item from at least two images in the first set of images, the at least two images being obtained at different points in time. The second feature extraction algorithm includes detecting a position of a returned item from at least two images from the second subset of images or from other sensor data. The determining may then indicate an inconsistency if the characteristic feature has a relative position with respect to the overall shape of the returned item which differs substantially in the at least two images from the first set of images.

Detecting the presence and position of at least one characteristic feature of the shape of a returned item may include using a foreground-background segmentation method to generate a processed image, classifying each pixel in said processed image as either an object pixel or a background pixel, and detecting a feature as a peak in the 1st derivative of a curve tracing the edge between object pixels and background pixels. This type of feature detection may, for example, detect fingers or other objects holding or being attached to the returned item, and then starting to move independently from the returned object.

In some embodiments of the invention, the first subset of images are obtained using an image sensor which is configured to view a returned object silhouetted against a background including a retroreflector, and where a light source and a beam splitter are configured such that the light source and the image sensor are optically co-located as seen from the retroreflector.

According to another aspect of the invention, a reverse vending machine is provided. The reverse vending machine may include an opening through which returnable items can be inserted into the interior of the machine, at least one image sensor configured to obtain images of at least a section of the interior, and at least one data processing unit. Furthermore, the reverse vending machine may comprise at least one data processing unit configured to receive a set of one or more images of a returned item inserted into the reverse vending machine from the at least one camera, at least one feature extraction unit configured to apply a first feature extraction algorithm to extract a first feature from at least a first subset of the set of one or more images and apply a second feature extraction algorithm to extract a second feature from at least a second subset of said set of one or more images. Alternatively, the second feature extraction algorithm may be applied to data received by the at least one data processing unit from an additional sensor. At least one data processing unit (i.e. the same data processing unit or a different data processing unit, or several data processing units operating in parallel) may be configured to determine whether a position or a motion of the first feature is inconsistent with a position or a motion of the second feature.

The reverse vending machine may further comprise an ultrasonic sensor configured to obtain sensor data from inside the interior and provide data to the at least one data processing unit. The feature extraction unit may then be configured to apply the second feature extraction algorithm to data received from the ultrasonic sensor. The reverse vending machine may also be provided with a laser ranging device instead of or in addition to an ultrasonic sensor. Either of these types of sensors may be used to estimate the position or motion of a returned item inside the reverse vending machine for comparison with the position or motion of some other object that may or may not be part of the returned item.

In order to determine or estimate motion (or changes in position over time), at least one data processing unit may be configured to control the at least one camera to obtain images at at least two different points in time.

According to one embodiment, at least one feature extraction unit is configured to apply the first feature extraction algorithm to an image obtained at a first point in time and to apply the second feature extraction algorithm to an image obtained at a second point in time. At least one data processing unit may then be configured to estimate a velocity of an object present in said interior based on the relative positions of the first and the second features, and to compare the estimated velocity with an expected velocity.

According to another embodiment, the at least one feature extraction unit is configured to apply said first feature extraction algorithm and said second feature extraction algorithm to images obtained at least two different points in time. At least one said processor may then be configured to estimate relative velocities for a first and a second object associated with said first and said second feature, respectively, and to indicate an inconsistent motion of the first object relative to the second object if there is a substantial difference between the first and the second estimated velocity.

In some embodiments of the invention, the reverse vending machine includes at least one image sensor with a relatively narrow field of view in order to capture images of barcodes attached to returned items at least partly present in said interior, and at least one second image sensor with a relatively wide field of view in order to capture images of the shape of returned items at least partly present in said interior. The returned item does, of course, not have to be fully present in the interior. As long as at least a part of the item can be viewed by at least one camera it does not necessarily matter if the item is entirely present, only partly present, moving into or moving out of the interior. Instead, this may be left as a design choice depending on the needs in a particular embodiment.

In some embodiments of the invention the reverse vending may further comprise a retroreflector, a beam splitter and a light source. At least one image sensor may then be configured to view a returned object silhouetted against the retroreflector, and the light source and the beam splitter may be configured such that the light source and said image sensor are optically co-located as seen from the retroreflector.

Consistent with the principles of the invention, the various components of the reverse vending machine may be implemented in different ways. For example, the feature extraction unit may be a set of computer program instructions stored in a storage device and executable by the at least one data processing unit to perform the various feature extraction operations. Alternatively, the feature extraction unit may be implemented as a Field Programmable Gate Array (FPGA) or as an Application Specific Integrated Circuit (ASIC). The reverse vending machine may, of course, include several feature extraction units.

DETAILED DESCRIPTION

In the following description various examples and embodiments of the invention are set forth in order to provide the skilled person with a more thorough understanding of the invention. The specific details described in the context of the various embodiments and with reference to the attached drawings are not intended to be construed as limitations. Rather, the scope of the invention is defined in the appended claims.

In the exemplary embodiments, various features and details are shown in combination. The fact that several features are described with respect to a particular example should not be construed as implying that those features by necessity have to be included together in all embodiments of the invention. Conversely, features that are described with reference to different embodiments should not be construed as mutually exclusive. As those with skill in the art will readily understand, embodiments that incorporate any subset of features described herein and that are not expressly interdependent have been contemplated by the inventor and are part of the intended disclosure. Explicit description of all such embodiments would, however, not contribute to the understanding of the principles of the invention, and consequently some permutations of features have been omitted for the sake of simplicity.

Figure 1:
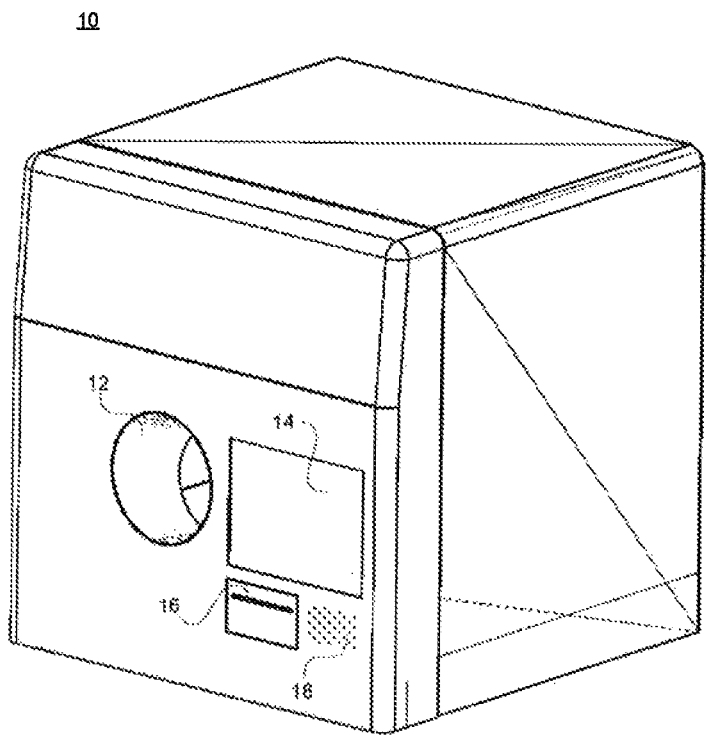
FIG. 1 shows a reverse vending machine consistent with the principles of the invention.

Reference is now made to FIG. 1, which illustrates in a perspective view a reverse vending machine 10 consistent with the principles of the invention. The machine can be located for example in a store that accepts receipt of returnable items and positioned such that it is easily accessible to customers with returnable items, and also such that returnable items can be conveniently stored at the rear of the machine, or in a location to which they can be easily transported from the rear of the machine, either automatically or manually.

The front of the machine includes an opening 12 into which returnable items can be entered by the customer. Also provided is a display for providing messages to the customer and an input device allowing the customer to enter simple commands, for example indicating that the customer has entered all their returnable items. As illustrated in FIG. 1, the display and the input device may be combined in the form of a touch screen 14. Alternatively, the display and the input device may be separate devices. The front of the machine 10 may also include a printing device 16 from which a receipt may be delivered to the customer. However, alternative ways of providing the customer with a receipt can also be contemplated, including transmission of an electronic receipt, over a wireless or wired network, to be received by an electronic device such as a cellphone or smartphone in the possession of the customer. The electronic receipt may also be sent directly to a checkout counter, or in the form of electronic payment to the customer's account. The customer may also be invited to select a charity to which the value of the returned items can be donated, using the input device functionality of the touch screen 14.

The machine 10 may also include a loudspeaker 18 or some other form of audible or visual alarm that can be used to issue notifications to the customer or to an operator for example in the case of a malfunction, storage capacity overflow or some other issue that needs attention.

Figure 2:
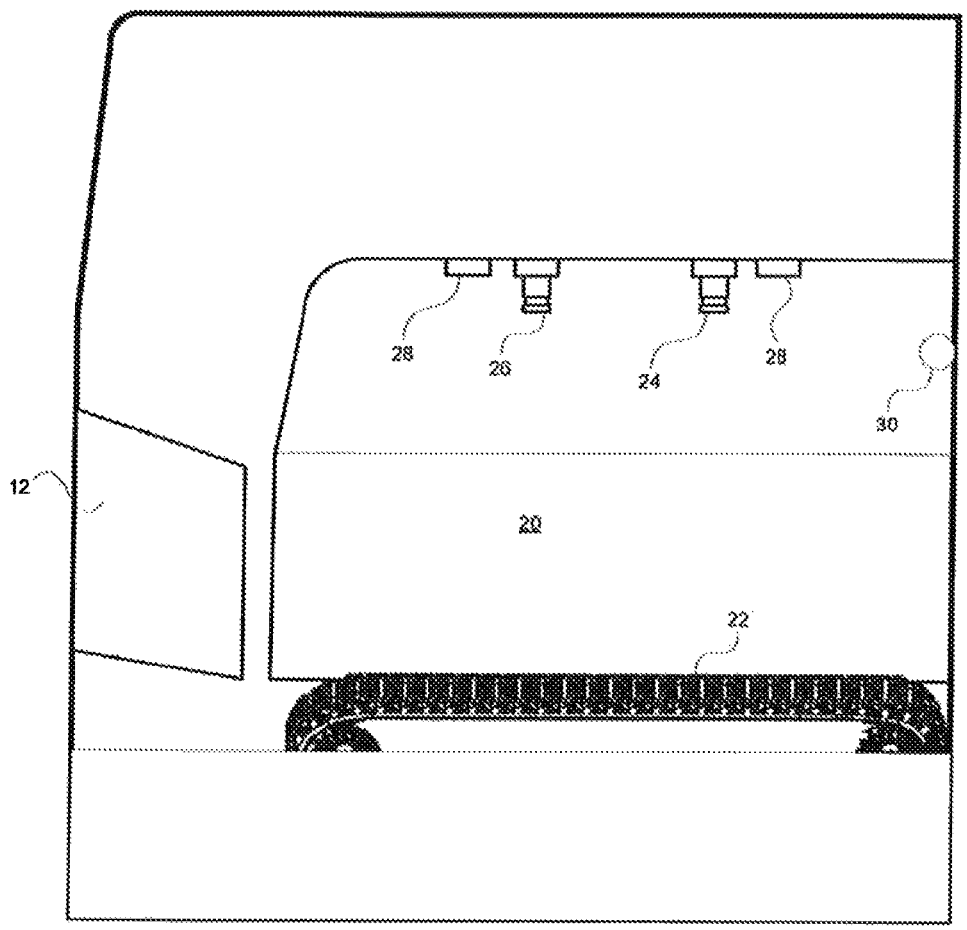
FIG. 2 shows a cross sectional view of the interior of a reverse vending machine.

When a customer enters a returnable item into the reverse vending machine 10, the item must be recognized, its authenticity verified and the appropriate value must be determined. FIG. 2 shows a cross sectional view of the most important components along the path traveled by a returnable item that has been inserted into the machine 10. When an item is returned it is entered through the opening 12 into a chamber 20. Inside the chamber there is provided a conveyor 22 capable of transporting the item from the opening 12 at the front of the machine 10 to the rear of the machine 10 where it can be stored or subject to further processing such as for example sorting, further transportation, and destruction. In other embodiments the conveyor 22 may be configured to transport the item in other directions or to deliver the returned item to additional transportation means or destruction means configured to transport the returned item to storage further away from the reverse vending machine or to be destroyed or compacted. It is also consistent with the principles of the invention to exclude the conveyor and to transport returned items by some other means, for example manually or by gravity (free fall or down a chute or slide).

Traditionally, a returned container is observed by one or more cameras 24 while it is transported through the chamber 20, and the images are analyzed electronically in order to determine the authenticity of the container. The images from camera or cameras 24 are typically used to analyze the shape of a container, and for simplicity this camera may be referred to as shape camera 24 in this specification.

Later developments have introduced barcode readers or other devices for recognizing markings on the containers. A number of different types of technologies for barcode readers are known in the art, but the principal features shared by most of them include a light source and a light sensor. The light source can for example be light emitting diodes (LEDs), lasers or lamps, and the light sensor can be one or more photodiodes, charge-coupled devices (CCDs) or CMOS, or any other sensor technology known in the art for use in cameras. According to the exemplary embodiment illustrated in FIG. 2, cameras 26 and light sources 28 are arranged in a pattern that allows a barcode or other marking to be read while the container is being entered into or transported through the chamber 20. Alternative configurations include readers that are positioned inside the chamber 20 or at the end of the conveyor 22, or even adjacent to the opening 12. Some of these configurations require that the container can be rotated while inside the chamber in order for any barcode or other marking on the container to become entirely visible to the barcode reader. This has for example been implemented as part of the functionality of the conveyor 22. In other embodiments the camera may be arranged such that the barcode can be read while the container is being entered into the chamber 20, but before it is brought to rest on the conveyor 22.

For ease of reference, camera or cameras 26 may be referred to as barcode camera 26 hereinbelow. It must be understood that the designations of shape camera and barcode camera does not imply that the images obtained from these cameras are exclusively or always used to analyze shape or read barcodes, as will become apparent from the following description.

In some embodiments of the invention the reverse vending machine may also receive one or more additional sensors 30, which for example may be based on ultrasound or laser technology.

Even though the returnable fee or deposit for each individual container is relatively small, large scale fraud is possible, and an important challenge in reverse vending is to detect and prevent fraud attempts. In this context a fraud attempt is an attempt at manipulating a reverse vending machine to accept a container that normally would be rejected, to manipulate the machine to register the same container repeatedly, or finding some other way to receive a return fee without having provided a corresponding number of returnable containers. In general, fraud attempts constitute something more sophisticated than simply presenting a non-returnable container, perhaps through error. Consequently, anti-fraud measures go beyond simply recognizing and distinguishing returnable containers from non-returnable containers, and include steps taken to detect more sophisticated attempts at deceit. However, this is not meant to imply that the algorithms or methods used to detect fraud cannot also contribute to correct identification and classification of returnable and non-returnable containers.

Traditionally, reverse vending machines have been configured to accept returned items if they can be properly categorized, based on characteristics such as shape, weight and barcode. Proper fraud detection has been absent, or limited to e.g. detection of foreign objects, such as a hand, present in the chamber 20 where the item is viewed by the shape camera 24.

Fraud detection is, of course, not necessary if a returned item cannot be recognized and properly classified as a returnable item in the first place; in such a case the item will not be accepted anyway. Consequently, fraud detection implies that a returned item is not accepted (and possibly that an alarm is triggered) despite the fact that the item is properly classified as a returnable item. The present invention is based on the realization that it may be possible to deceive a reverse vending machine to accept non-returnable containers if the only fraud detection is the detection of foreign objects by the shape camera, and that the likelihood of success for a particular deception scheme may depend on the configuration of the reverse vending machine. Consequently, the need for sophisticated detection methods may also depend on the configuration of the machine. Many deception schemes do not require use of foreign objects, or the objects may be so small that they cannot be detected by traditional shape cameras and their attendant image processing and classification algorithms. However, most fraud attempts will involve spatial or temporal inconsistencies that can be detected if the necessary images are provided and are properly analyzed.

According to the present invention this can be accomplished by obtaining two or more images, at least one of which is an image of a returned item. The images can then be subjected to feature extraction algorithms in order to extract at least two features from the images, and a determination can be made based on any inconsistency in the position or motion of one of the features with respect to the other feature.

It has furthermore been realized that different features can be indicative of different types of fraud attempts, and consequently, that different feature extraction algorithms can be used depending on what type of fraud one is attempting to detect. It is also possible to combine different types or classes of feature extraction algorithms and different methods for obtaining the two or more images in order to be able to detect a wide range of different fraud attempts. The present invention is therefore not limited to a selection of only one of the embodiments described below. To the contrary, any or all of the methods, algorithms, arrangements and configurations described below can in principle be combined in any one reverse vending machine, and they can be configured to look for inconsistencies that are strictly based on the determination of position or motion, or any combination of these. It is furthermore contemplated to use algorithms that each result in a particular confidence score and to combine the confidence score obtained by the various detection and determination algorithms to obtain a combined, or final, confidence score which determines if a fraud attempt has been detected or not.

Figure 3:
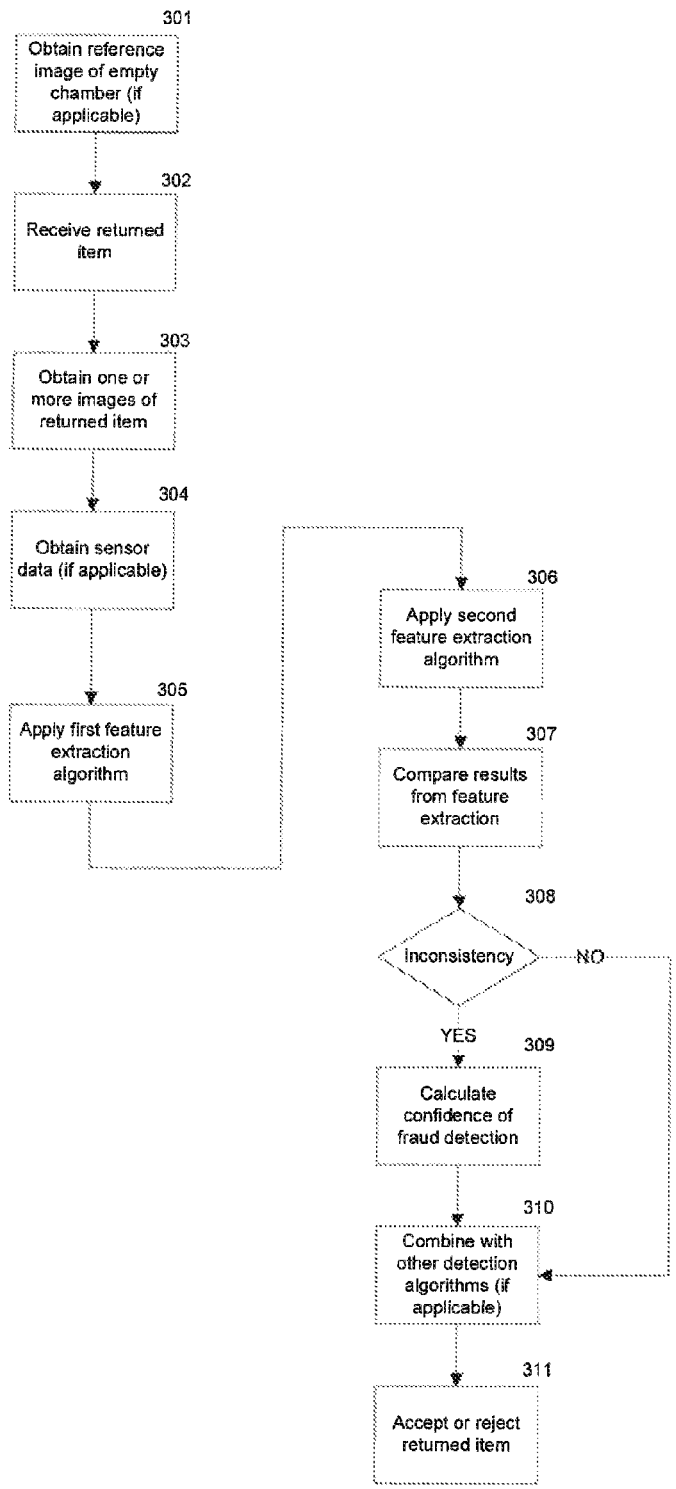
FIG. 3 is a flowchart illustrating the various steps of a method according to the invention.

Reference is now made to FIG. 3, which illustrates in a flow chart the various steps of a method consistent with the principles of the invention. In some embodiments of the invention one or more reference images of the chamber 20 without any returned item present may then be performed in step 301. The reference image or images are stored in a memory of the device. The memory may be a hard drive or any other type of non-volatile memory, or even a volatile memory, such as for example the random access memory (RAM) of an image processing unit. The memory may be part of the reverse vending machine as such, or it may reside in a different computer accessible to the reverse vending machine over a computer network.

In a following step 302 a returned item is received through an opening 12 in the reverse vending machine. In a next step 303, one or more images of the returned item are obtained as the returned item is moving through the opening 12, is present in the chamber 20, is moving through the chamber 20, or is moving out of the chamber 20. The actual position of the returned item while the image or images are obtained may depend on the choices of configuration and algorithms in a particular design, and the invention as such is not limited to any particular selection in this regard. The image or images may be obtained using one or more cameras, as described in further detail below.

After at least one image has been obtained in step 303, the process moves on to step 304 where additional sensor data is obtained using sensor 30. This step is not present in all embodiments of the invention, as will be explained in further detail below.

In a following step 305, a first feature extraction algorithm is applied to a subset of the images obtained in step 303 in order to extract a feature from one or more of the images that have been obtained. It should be noted that the first feature extraction algorithm may be applied to only one image, to several images, or to a composite image resulting from pre-processing of several images prior to the application of the first feature extraction algorithm. It should also be noted that the process of obtaining images in step 303 and sensor data in step 304 may continue while the first extraction algorithm is applied in step 305, for example in order to provide additional images to be subjected to the first extraction algorithm in step 305, to provide a second subset or additional sensor data to be subjected to the second feature extraction algorithm in step 306, or both. The term subset is intended to cover one, some or all of the images that are made available to the image processing methods, depending on design choices and choice of feature extraction algorithms in any particular embodiment.

In step 306 a second feature extraction algorithm is applied to a second subset of images or to data received from an additional sensor 30. If the second feature extraction algorithm is applied to a second subset of images, the images belonging to the two sets may have been obtained substantially at the same time, for example using different cameras, or they may have been obtained at different points in time. In the latter case, the images subjected to the second feature extraction algorithm may have been obtained after the images subjected to the first feature extraction algorithm. However, the images subjected to the second feature extraction algorithm may also have been obtained prior to the images subjected to the first algorithm. For example, if a particular feature has been extracted by the first feature extraction algorithm from a current image, the second algorithm may search for the same feature in a previous image.

It should be noted that the first and the second algorithms are two different algorithms, and in the terminology adopted in this specification using the same algorithm twice in order to find two different features, for example in two different images, would not be a use of a first and a second algorithm, but the use of a first algorithm twice. However, the first and the second algorithm may have some features in common. For example, both algorithms may use edge detection, or both algorithms may use computation of autocorrelation.

In a next step 307, the results of the feature extraction algorithms are combined or compared, or otherwise processed, in order to determine if there are any inconsistencies that may indicate that the reverse vending machine is subjected to a fraud attempt. The determination may be based on the relationship between the results of the two feature extraction algorithms in order to determine at least a position or a motion of one feature relative to another, which is inconsistent with a normal return of a regular returnable item. A position may for example be the relative position of two objects (or features indicative of the presence of two objects) detected substantially at the same time. A motion may be the position of one object (feature) relative to the position of another object (feature) at two different points in time, indicating for example that two objects that should have been part of the same larger object, such as a returnable item, are not since they are moving independently inside or through the chamber 20.

If it is determined that an inconsistency is detected, as indicated by the branch point 308, the process moves on to step 309 where a confidence level of fraud detection is calculated. In some embodiments of the invention only one scheme for fraud detection is used, and determination is binary. In other words, the confidence level is either 0 when no inconsistency has been detected (corresponding to the NO branch of decision point 307), or the confidence level is always set to 1 in step 308, and a positive determination of a fraud attempt is made for any inconsistency detected. Alternatively, the confidence level is set somewhere between 0 and 1 depending on the degree of inconsistency determined in step 307. The resulting level of confidence can then be combined with the result of other detection algorithms in step 309 for a resulting total confidence level. The additional fraud detection algorithms or methods may be variants of the present invention, as described in further detail below, they may be different fraud attempt algorithms that in themselves are not part of this invention, or they may be a combination of both.

Those with skill in the art will understand that the illustration of branch point 308 and the conditional execution of calculation step 309 is conceptual, and not intended to be interpreted as a limitation. Indeed, the comparison step 307, the branch point 308 and the calculation step 309 may for example be one routine that calculates a value representing the confidence level for fraud detection continuously as images and sensor data are received, without any determination being made regarding whether or not such a calculation should take place. In other words, the comparison may be a calculation of a confidence. In other cases, it may be necessary to actually find the sought for features to actually compare them in step 307, and to actually determine that some form of inconsistency is observed before invoking an algorithm for calculating a confidence level. The choices made in this respect are left as design choices, and may be determined based on for example whether the sought after features always are present, or only in special cases, on the cost in terms of computing power to perform the various steps, and other design choices.

It should also be noted that confidence levels of between 0 and 1 is an arbitrary choice, and that alternative ways to score the likelihood, or confidence, of fraud detection can be contemplated without departing from the principles of the invention. In some embodiments of the invention, several methods of fraud detection all result in a score of a number of points that are added together in step 310 to a total score. The decision in step 311 to accept or reject the returned item, and possibly take other action such as issuing an alarm signal, can then be based on one or more threshold values for this total score.

After the resulting fraud confidence has been determined the returned item has been accepted or rejected in step 311, the process is finished with respect to that particular set of images (and sensor data, if applicable), but it may be repeated for the next set. The next set may still relate to the same returned item until the item leaves the chamber 20 (depending on which features are compared, where the cameras are mounted etc), or they may relate to a subsequent item. It is consistent with the principles of the invention to process data relating to more than one item at the same time. For example, a first item may be on its way through the chamber 20 while a second item is being inserted through the opening 12. If both items are in view of cameras and/or sensors in a manner that provides the necessary data for performing the steps of the invention for both items in parallel, this is within the scope of the invention. Also, if more than one type of inconsistency is sought for, as discussed with respect to step 310, the various feature extraction and detection algorithms may be executed sequentially or in parallel, depending on configuration and design choices in each case.

A word on terminology may be appropriate at this point. While the following definitions are not intended to be interpreted as limitations on the scope of the invention, they will be adopted in the description of the various embodiments in order to facilitate clarity and understanding. As such, the term returnable item will be used to refer to an item that should be accepted by the reverse vending machine and a corresponding refund or deposit should be credited towards the person returning the item. A returnable item will typically be an empty bottle, can or some other container, but the invention is not restricted only to those types of items. A returned item is an item which is being returned and for which it remains to be determined whether a fraud attempt is being made or not. In other words, a returned item may or may not be a returnable item. An object is any particular thing or part of a thing that is being inserted into the reverse vending machine or that is present in the chamber 20. An object may be a returned item, a part of a returned item, or a foreign object. A feature is anything that can be observed in or extracted from an image or a plurality of images or from other sensor data using a feature extraction algorithm. A feature may be indicative of the presence of an object or part of an object. Position will be used to refer either to the position of an object in the chamber 20, or the position of a feature in an image. By way of example, but without limitation, a first feature may be representative of the presence, position or motion of a bar code, a security mark or an object with a particular attribute (e.g. particularly thin, having a particular shape etc), and a second feature may be representative of the presence, position or motion of a returned item as a whole, a part of a returned item (e.g. the bottom or the top). Any combination of these and other features consistent with the terminology outlined above are intended to be covered by this terminology.

Figure 4:
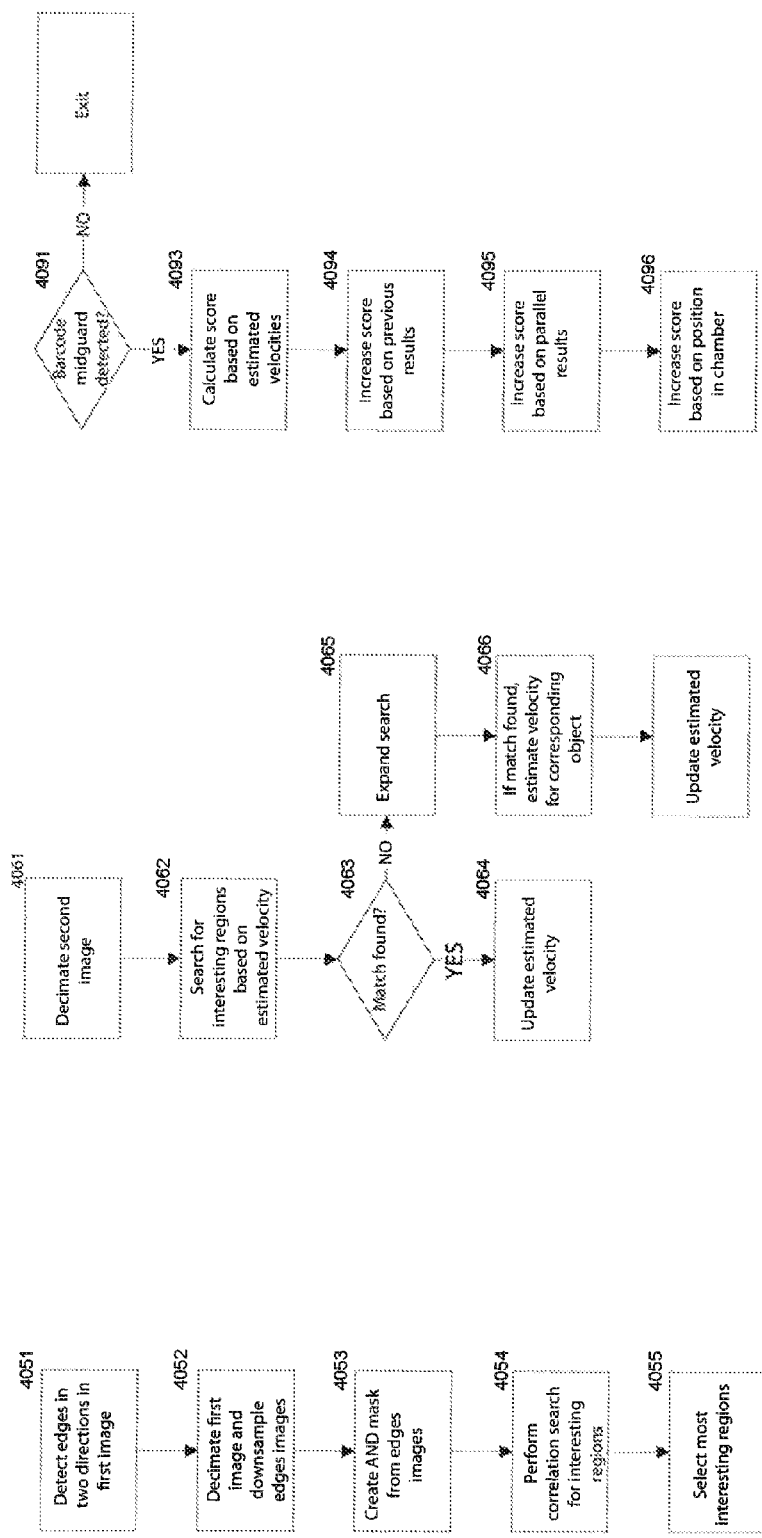
FIGS. 4A-C are flowcharts showing in further detail some of the steps in one embodiment of a method according to the invention.

FIG. 4 is a flow chart illustrating further details of an embodiment of the invention. This embodiment is based on optical correlation between at least two images in order to detect motion inside the return chamber 20 that is inconsistent with the normal operation of a vending machine when a returnable item is received. According to this particular embodiment there is no need for any reference images, and the process starts in a step corresponding to step 302 in FIG. 3 when a returned item is inserted into the reverse vending machine. In a following step, corresponding to step 303 in FIG. 3 two or more images of the returned item are obtained. Typically, a continuous sequence of images are obtained such as for example from one or more video cameras and the likelihood of fraud, expressed as a confidence level, may be higher if inconsistencies are detected in images obtained from more than one camera. However, without loss of generality, the following discussion will assume that the process is performed on two images obtained at different points in time, and those with ordinary skill in the art will realize that the two images may be the only two images obtained, they may be part of a sequence of images obtained while the returned item is moving through a particular section of the path from the opening 12 and through the chamber 20, or even the entire path, or images may be obtained continuously even when no returned item is present. It is also consistent with this embodiment of the invention to obtain several "parallel" sequences of images obtained from a plurality of cameras.

In a sequence of steps 405X corresponding to the first feature extraction algorithm step 305 in FIG. 3, a first image is subjected to the first feature extraction algorithm in order to identify an interesting region in the first image. An interesting region can be defined as a region which can be reliably tracked from one frame to the next, i.e. which can be found in a second image by a second feature extraction algorithm. In order to be suitable the region should be as unique as possible within the image, and it should have a reasonably sharp correlation peak. Considerations that should be taken into account when searching for an interesting region include that the region should not correlate with other regions of the image in order to avoid incorrect tracking. However, the correlation should not be so sharp that subtle changes in illumination or the resolution of the camera obtaining the images can result in difficulties in tracking the feature from one image to another. Corners, and squares in particular, are ideal features for this type of region identification.

In step 4051 edge detection along two axes is performed in order to detect corners. It is within the scope of the invention to detect other features, but an advantage of edge detection along two axes is that corners are easy to track from frame to frame, and that the algorithm for detection of barcodes, which is typically implemented already in most reverse vending machines, can be used also to perform this edge detection. The edge detection results in two binary images, one for each direction. In a following step 4052 these two edge images are downsampled and the first image is decimated in order to create a low resolution image. Decimation is a two step process including low-pass anti-aliasing filtering followed by downsampling. In an example consistent with this embodiment of the invention the low pass filter is a simple averaging filter, and the image is downsampled with a factor of 8 in each axis, from an original image resolution of 296 by 752 pixels to a resulting resolution of 37 by 94 pixels. Other resolutions and decimation factors are, of course, consistent with this embodiment of the invention, as will be readily understood by those with ordinary skill in the art. The edge images and the original first image are downsampled to the same resolution.

After the edge images have been downsampled, they may be combined in step 4053 using an AND operation. It may now be necessary to remove regions of the mask where the original image frame was close to saturation or where the camera's field of view is obscured by internal parts of the reverse vending machine, for example rollers or LEDs. The resulting mask may now be used in order to identify regions that have both vertical and horizontal edges. Finding edges along any two substantially orthogonal edges is within the scope of the invention, however, and the terms vertical and horizontal are chosen for convenience.

In a next step 4054 the search for interesting regions is performed. According to an exemplary embodiment an 8-by-8 square in the decimated image is used for the correlation. For each point in the downsampled AND mask with the value 1, a corresponding pixel in the decimated image is selected, and an 8-by-8 square with that pixel in its center is used for the correlation. This square is correlated with corresponding squares shifted a number of pixels to each side. Squares with a small peak to peak range of the pixels it includes, for example less than 64, may be discarded, since they typically will generate poor quality correlations and they will most likely be images of the background and not of any object in the chamber 20. In an exemplary embodiment, correlation is performed by correlating the square with a corresponding square shifted one pixel in each cardinal direction (North, South, East, West—or up, down, right, left) within the same frame. The results should be fairly high, for example with an average value for the four correlation values that is higher than 0.5. Otherwise the precision required when searching for the same feature in a different image may become too high. A further autocorrelation may then be performed, this time while moving the shifted square four pixels. The results of these correlations should be low, for example with a maximum value for the four correlation values not higher than 0.5, otherwise there may be too many acceptable correlations in the wrong parts of other images.

If the square passes these tests it contains a feature with a reasonably sharp correlation peak, and it may then be subject to a scoring algorithm. Before scoring, the eight neighboring pixels of the value 1 point in the AND mask may be set to zero in order to avoid evaluating points that are too close or overlap. According to some embodiments, a scoring algorithm may be calculated as the peak-to-peak range, plus 100 times the sum of the four nearby correlations (shifted e.g. 1 pixel), minus 100 times the sum of the four far-away correlations (shifted e.g. 4 pixels). Other scoring algorithms are, of course, within the scope of the invention.

This process is repeated with a new 8-by-8 square for each value 1 point in the AND mask, and in step 4055 the four highest scoring regions are used as the extracted features from the first algorithm. In other embodiments fewer or more than four interesting regions are selected.

According to the process described above, edge detection is performed before downsampling, which is performed before the creation of the AND mask. In alternative embodiments, the sequence of steps may be different. In particular, edge detection does not have to be performed at full resolution, but can instead be performed on the decimated image, in which case it is not necessary to downsample the resulting edge images. They will instead already have the same resolution as the decimated image.

In a sequence of steps 406X corresponding to the second feature extraction algorithm step 306 in FIG. 3, a second image is subjected to the second feature extraction algorithm in order to search for regions in the second image that correspond to the interesting regions in the first image. The second image may be a previous image that is already stored in memory in the reverse vending machine, or the process may wait, if necessary, until a later image is obtained and search for the interesting regions in that image. Whether the second image has already been obtained, is obtained while the first image is processed, or is obtained after the first image has been processed and it has been determined that qualifying interesting regions actually are present, the principles remain the same, and conceptually the second image is illustrated in FIG. 3 as being obtained in step 303.

In step 4061 the second image is decimated in a process corresponding to that which is performed on the first image. In a subsequent step 4062 the decimated image is subjected to the actual search. This can be done based on an estimate of the velocity with which the returned item is moving through the reverse vending machine. Using this estimate it can be determined where in the second image the four interesting regions extracted from the first image can be expected to be found. For each of the four regions (or however many regions a particular embodiment of the invention dictates) a corresponding feature is searched for by correlating the feature extracted from the first image (an 8-by-8 block) with a corresponding 8-by-8 block in the estimated position. In most embodiments the search will first be performed in a region surrounding the estimated position, for example for 16 8-by-8 blocks with their center in a 4-by-4 grid of pixels.

If it is determined in step 4063 that a sufficiently good correlation is found, the velocity estimate can be updated in step 4064 based on how far away from the estimated position the best correlation was found. If more than one camera is used, several velocity estimates may be maintained, one for each camera, since different cameras may view the returned item from different perspectives and distances. Velocity estimates may also be based on other data, for example a different camera such as shape camera 24, an additional sensor 30, the velocity with which the conveyor 22 transports the returned items, etc. A positive match inside the region first searched is not in itself an indication of fraud, but the velocities estimated for the four regions are further processed in step 307 and the following steps in FIG. 3.

If it is determined in step 4063 that none of the squares in the selected regions correlate well enough, the search may be expanded in step 4065 in further 4-by-4 regions in the four cardinal directions, by expanding the original 4-by-4 region with one pixel in each direction, or in some other convenient manner. If this still does not produce a positive match, the search can be expanded even further and a coarse-grid search can be performed using a lower threshold initially, and then home in around successful correlations.

If a good correlation is found in the second image, a velocity for the feature, and thereby the velocity for a corresponding object present in the chamber 20, can be estimated in step 4066. If this estimate deviates too much from the estimated velocity used to initiate the search in step 4061, or from some other reference velocity, this in itself can be an indication of fraud. This may be the case for example if the estimated velocity is negative, indicating that there is an object moving backwards in the chamber 20. Also, if a feature is missing altogether, this may indicate that an object is travelling suspiciously fast or is concealed in some manner. Such a condition may contribute towards the final confidence level calculated in step 309 in FIG. 3.

When a velocity can be estimated, perhaps from multiple regions, the estimated velocity for that camera can be updated in step 4067, corresponding to the update performed in step 4063.

In a sequence of steps 409X corresponding to step 309 of FIG. 3, a total score is calculated, representative of how likely it is that a fraud attempt is in progress based on the results of the steps described above. This score is referred to as the confidence level.

In a first step 4091 it is determined whether a barcode mid-guard has been detected. If this is not the case the process moves on to step 4092 and exits. If other detection algorithms are operated concurrently, the results of these may still be taken into consideration in a step corresponding to step 310 in FIG. 3, but for the purposes of this particular embodiment, no contribution to the confidence level is made from the process illustrated in FIG. 4 before a barcode mid-guard has been detected. Of course, the invention is not limited in this respect, and it is consistent with the principles of the invention to proceed to step 4093 even if no midguard has been detected.

In step 4093 a score can be calculated based on the estimated velocities for the features that were detected in the process described above. Several possibilities are within the scope of the invention. The score may for example be based on the feature with an estimated velocity that deviates the most from the current estimate of the velocity with which the returned item is moving. The score may also take into consideration any difference in estimated velocity for the detected features, i.e. instead of or in addition to doing a comparison with the estimated velocity for the returned item, the internal consistency of the movement of several features may be considered. The score may then be increased by any results from step 4065, for example a feature travelling with a negative velocity or not being found in the search at all.

In a next step 4094 the score is again increased if a condition indicating fraud was detected in a previous execution of the process, indicating that the suspicious condition is present over time. For example, the score may be doubled for each frame that indicates a fraud attempt that was also indicated in a previous frame for that camera.

In step 4095 the score may again be increased based on parallel results. For example, in an embodiment with several cameras the score may be increased in proportion with the number of cameras that detect the same indication of fraud.

Finally, in step 4096 the score may be increased depending on where in the chamber 20 the detected feature, or more precisely its corresponding object, is located. Anomalies may be more likely to occur near the opening 12 without this being a clear indication of fraud, and conversely, anomalies that occur near the end of the chamber 20, which translates to late in the sequence of images obtained of a particular returned item, are more likely indications of fraud. According to one embodiment, the score is therefore doubled for images obtained in the middle third of the sequence of images and tripled for images obtained in the last third of the sequence.

It will be understood by those with skill in the art that other scoring schemes may be contemplated, and that all, some or none of the methods for increasing the score may be used in any combination or sequence.

Figure 5:
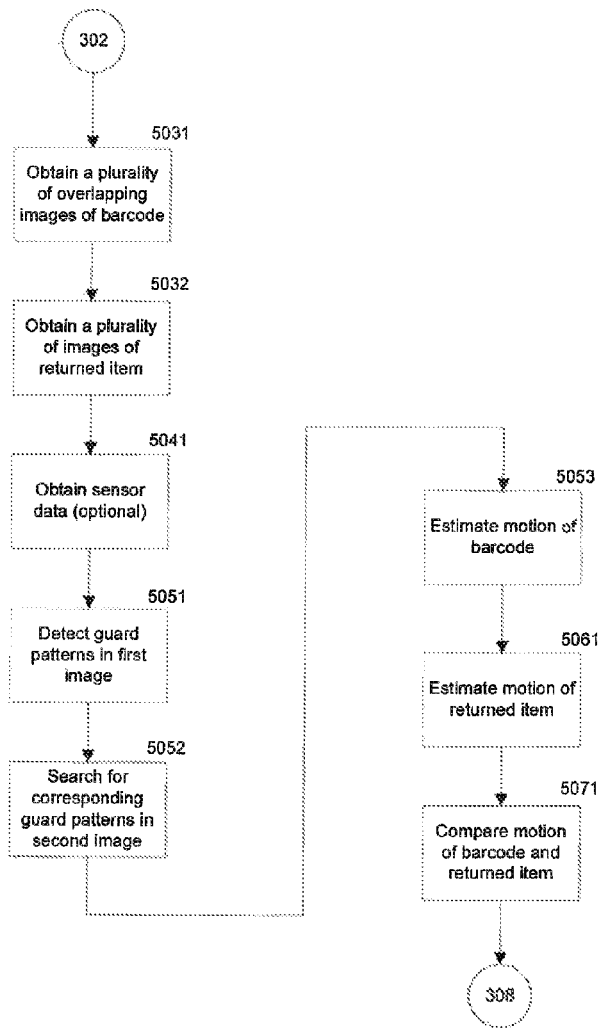
FIG. 5 is a flow chart showing in further detail some of the steps in another embodiment of a method according to the invention.

Reference is now made to FIG. 5, which is a flow chart illustrating further details of another embodiment of the invention. This embodiment is based on consistency in the detection of a barcode on a returned item. In particular, this embodiment attempts to detect barcodes that move differently from the returned item along the transport direction inside the reverse vending machine. This may occur for example if a valid barcode is attached to a stick that is inserted into the reverse vending machine at the same time as an invalid item is returned. The intention of the person attempting the fraud is that the barcode camera 26 will read the valid code and that the returned item will be accepted as a result.

According to this embodiment, the process again starts in a step corresponding to step 302 in FIG. 3 with the insertion of a returned item into the reverse vending machine. In a following step 5031 several overlapping images of a barcode on the returned item are captured while the barcode is visible to the barcode camera(s) 26. Exactly where in the chamber 20 this will be depends on the position of the barcode camera 26, which may be left as a design choice. In a next step 5032 a plurality of images of the returned item are obtained from the shape camera 24.

In a next step 5041 sensor data from sensor 30 are obtained. In some embodiments this step, which corresponds to step 304 of FIG. 3, may replace step 5032. Alternatively the data obtained in this step may supplement the data obtained in step 5032, or step 5041 may be omitted.

In a sequence of steps 505X corresponding to step 305 in FIG. 3, features are extracted from the images obtained from the barcode cameras in step 5031. Barcodes typically include guard patterns in a manner which is well known from the Universal Product Code (UPC) and variants of UPC such as EAN, JAN and IAN. The guard patterns are a predetermined pattern of bars and spaces at the left, middle and right of the code. Consistent with the principles of the invention, an attempt is made to detect at least one of the guard patterns of a barcode in a first image in step 5051. If more than one guard pattern is detected in an image and they are of the same type and are close to each other, they can be merged into a cluster of guard patterns. In a following step 5052 a search for a corresponding cluster is performed in a second image. The second image may be a previous image that is already stored in memory in the reverse vending machine, or the process may wait, if necessary, until a later image is obtained and the search may then be performed in that later image. Whether the second image has already been obtained, is obtained while the first image is processed, or is obtained after the first image has been processed and the guard pattern has been detected is conceptually the same in this respect. The step of obtaining the second image is part of the image acquisition of step 303 illustrated in FIG. 3.

The degree of match between a guard pattern or cluster of guard patterns detected in the first and the second image can for example be based on whether they both include the same type of guard pattern (left, mid, right), that the clusters have similar vertical position in the two images and that there is a minimum of match in the digits read from the two clusters. Based on these criteria, a match confidence can be generated. According to one embodiment, a match confidence on a scale from zero to one is assigned to all possible cross matching of clusters from the first to the second image. Matches with a sufficiently high match confidence can then be selected, and in step 5053 the motion of the barcode can be estimated based on the displacement of the matched guard clusters from one image to the next.

The feature extraction algorithms used to detect barcode guards and digits may already, at least partly, be implemented in the barcode reading algorithm of the return vending machine. However, since it may be desirable to detect potential code elements (clusters) in all images at all times, e.g. to detect labels with codes at all possible positions in the chamber 20, additional processing may be required compared to the requirements for barcode reading only, since the barcode reading can be terminated as soon as a valid code has been read.

Moving on to step 5061, corresponding to step 306 of FIG. 3, the images from the shape camera 24 and/or data from the sensor 30 are processed and an estimate of the motion of the returned item is extracted. This process is not illustrated in detail, but may be based, for example, on detection of characteristic features of the shape of the returned item as detected in images obtained by the shape camera, or on velocity or range determination based on signals issued and received by the sensor 30, for example based on well known ultrasound or laser technologies.

Figure 6:
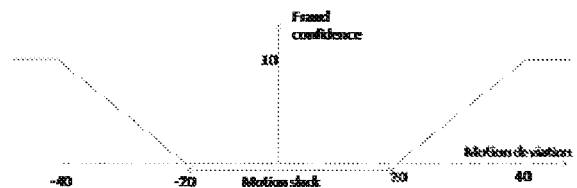
FIG. 6 shows an example of fraud confidence as a function of detected inconsistencies in one embodiment of the invention.

In step 5071, corresponding to step 307 of FIG. 3, the determined motion of the barcode and the returned item are compared. The process then continues as illustrated in step 308 of FIG. 3. If fraud is indicated, the calculated fraud confidence of step 309 may be based on the deviation in motion. The confidence may be binary, in the sense that a fraud attempt is indicated as ongoing if the deviation is above a certain threshold, and determined to be absent if the deviation is below the threshold. In other embodiments the fraud confidence is a function of the deviation. An example of such a function is illustrated in FIG. 6, which shows the fraud confidence as a function of deviation between barcode and returned item motion. The deviation is given as pixel units in the barcode images and the confidence score is on a scale going from 0 to 10.

Figure 7:
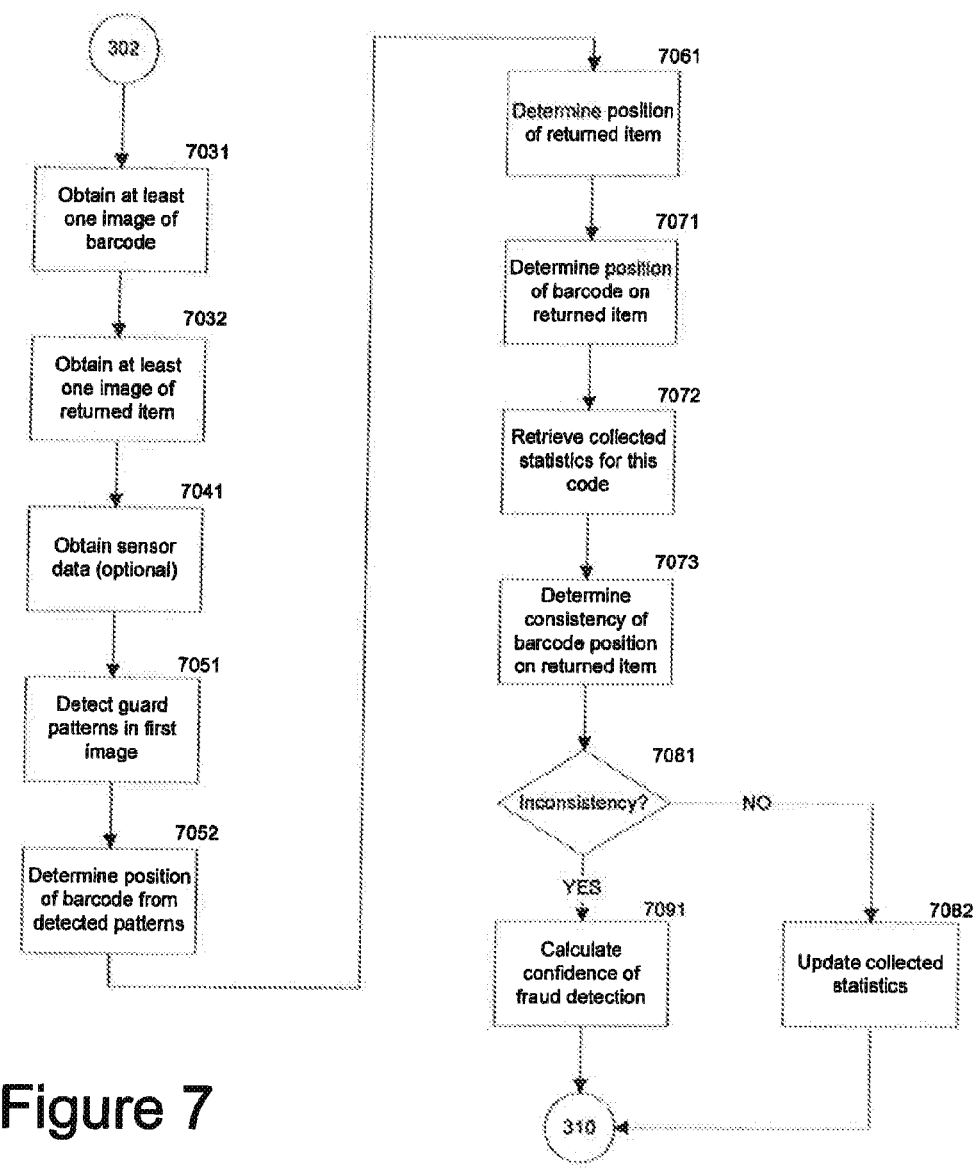
FIG. 7 is a flowchart showing in further detail some of the steps in yet another embodiment of a method according to the invention.

The embodiment illustrated in FIG. 7 is an alternative way of detecting barcode inconsistency. In this embodiment it is not the relative motion, or velocity, of the barcode with respect to the returned item that is measured, but the position. The fraud attempt may be the same, for example that a valid barcode is inserted using a stick or string, and withdrawn after it has been read by the barcode camera or cameras 26.

Determination of the velocity with which a barcode is moving may in some instances be difficult or unreliable. As described above, it is necessary to detect the same guard patterns from one image to the next. For example, a barcode moving independently of the returned item may move too fast for any reliable estimate of its motion to be determined, for example when it is pulled out again from the reverse vending machine by the person attempting the fraud. In an alternative embodiment, which may be used instead of or as a supplement to the embodiment discussed with reference to FIG. 5, determination of the barcode velocity is not necessary. Instead, it is necessary to know approximately where on a returned item a valid barcode can be expected, taking into account that different items have barcodes located in different positions, and that some items may include several valid barcodes located in different positions on the item.

It is possible to maintain a database in the reverse vending machine, or one that is accessible to the reverse vending machine, in which the possible locations of the code on all recognized returnable items are stored. Such a database may be continuously updated online. Alternatively, short term statistics may be generated based on data collected during a customer session (i.e. the period from a first returned item is inserted to the customer indicates that all items have been returned by requesting a receipt), or over a predetermined period of time. These statistics can be based on the assumption that items of the same kind, i.e. items bearing the same code, should have the code in approximately the same position. During a session, the detected position of a particular code on each item bearing that code can be collected, and a fraud attempt can be reported if the same code is detected at several different positions on returned items.

Again the process starts as in FIG. 3 when a returned item is inserted into the reverse vending machine in step 302. In step 7031, at least one image of the barcode is obtained, and in step 7032 at least one image of the returned item is obtained. In addition, or as an alternative to step 7032, sensor data is obtained in step 7041. In step 7051 guard patterns in the barcode image are detected, and the detected patterns are used in step 7052 to determine the position of the barcode in the chamber 20. In a following step 7061 the position of the returned item is determined based on the at least one image of the returned item obtained from the shape camera 24 in step 7032 and/or from the sensor data obtained in step 7041. It will be understood that the position of the barcode and the returned item must be determined at substantially the same time.

In a sequence of steps 707X corresponding to step 307 of FIG. 3, the position of the barcode is compared to the position of the returned item and the consistency of the barcode position on the returned item is determined. In step 7071 the results of the two previous steps are combined in order to determine the position of the barcode on the returned item. In step 7072 the position that has been established as statistically valid, based on previously returned items, is retrieved in order to be compared with the position determined in step 7071. In alternative embodiments this position may be retrieved from a database of valid barcode positions, as described above.

Figure 8:
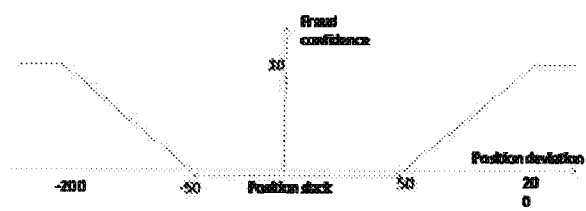
FIG. 8 shows an example of fraud confidence as a function of detected inconsistencies in the detected positions of a barcode or security code.

In step 7073 the consistency of the barcode position relative to the position of the returned item, as determined based on the collected statistics, is determined. If there is no inconsistency, the process moves from branch point 7081 to step 7082 where the collected statistics are updated with the position detected in this instance. If, however, the position is inconsistent with previous detections, the process proceeds to step 7091, corresponding to step 309 in FIG. 3, where a confidence of fraud detection is calculated. The confidence can be a function of the deviation between the statistically determined valid position and the currently determined position. FIG. 8 illustrates an example of fraud confidence as a function of deviation in position between the current and earlier detections of a code. The deviation is measured as pixels in the barcode images, and the fraud confidence is on a scale from 0 to 10.

It should be noted that several positions may be valid for different items bearing the same code, such that it may be pertinent to collect statistics on position even if an inconsistency is detected (e.g. prior to branch point 7081, or as part of step 7091 as well as step 7082). For example, all positions that have already been detected once may be considered as acceptable if they are repeated, or the average position of any cluster of positions within a certain range from each other may be considered acceptable as soon as the cluster includes a certain number of detected positions. It will be understood that the first instances inside such a cluster, i.e. the positions detected before enough instances have been detected to determine that the position is assumed to be a valid one, will be detected as inconsistent, but they may not contribute enough to the accumulated fraud confidence in step 310 to result in a rejection of the returned item or an issuance of any alarm.

A further embodiment of the invention is based on the realization that many fraud attempts include foreign objects that are difficult to detect because they are very thin or because they appear as part of the returned item due to close proximity. Consequently, detection of thin objects or edges and their proximity or movement relative to the returned item can be used as an indication of a fraud attempt.

Schlieren photography is a visual process that is well known for visualization of the flow of fluids of varying density. However, the process is also useful for detection of shapes, edges and thin objects, and it has previously been suggested to use Schlieren cameras or similar systems as the shape camera 24 in reverse vending machines. U.S. Pat. No. 5,898,169, which is hereby incorporated by reference in its entirety, describes a device where containers such as bottles pass between a retroreflector and a Fresnel lens. Light from a light source is passed through a beam splitter and the Fresnel lens, reflected by the retroreflector back through the Fresnel lens, and directed from the beam splitter to a camera. The camera will then see objects such as bottles passing through the area between the retroreflector and the lens as dark silhouettes against a bright background. Another Schlieren-like system for determining the characteristics of e.g. a bottle that is placed in an observation area is described in U.S. Pat. No. 7,633,614, which is hereby incorporated by reference in its entirety. The description of the present embodiment will assume that least one barcode camera 26 is capable of operating in a Schlieren-like mode or in some other mode facilitating observation of shapes, edges and thin objects, as will be described in further detail below. In addition the shape camera 24 may be part of a Schlieren-like system.

Figure 9:
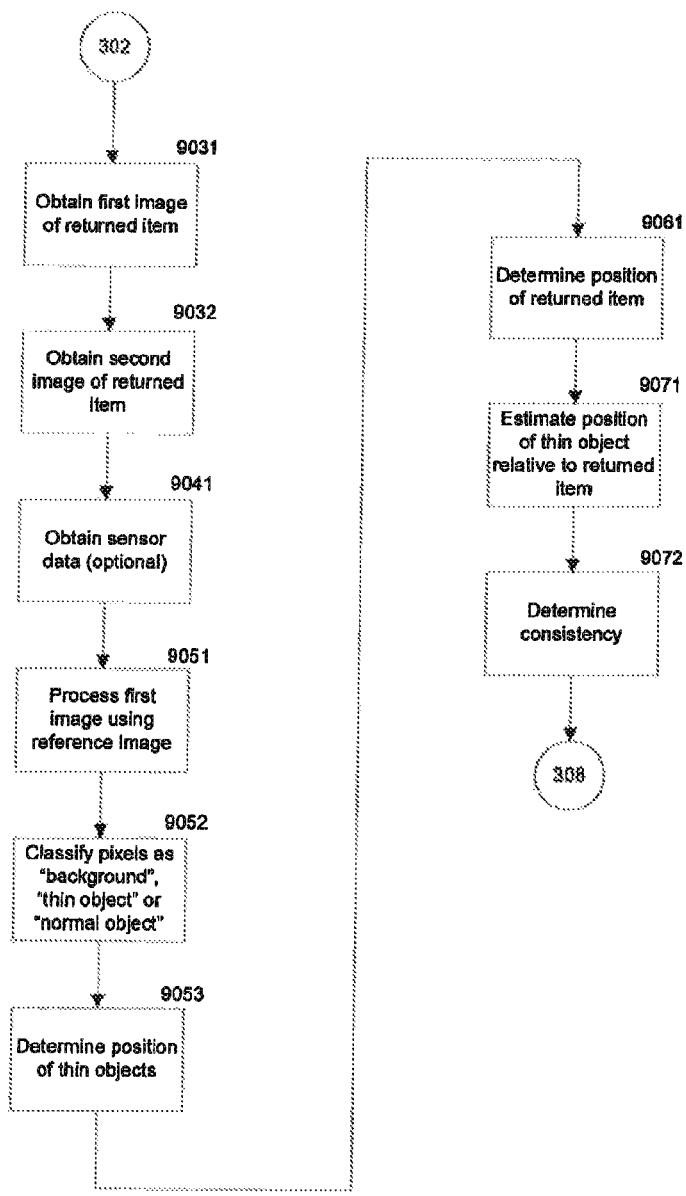
FIG. 9 is a flowchart showing in further detail some of the steps of an another embodiment of a method according to the invention.

A process implementing this embodiment is illustrated in a flow chart in FIG. 9. The initial step of obtaining a reference image while the chamber 20 is empty is performed using a barcode camera in Schlieren mode. This step can be performed while the reverse vending machine is in an idle mode, and the stored images may be regularly updated by repeating this step at regular intervals. In a next step a returned item is received by the reverse vending machine. These steps are illustrated as step 301 and step 302 in FIG. 3. The process then proceeds to step 9031 where at least one image is obtained using the same camera as for the reference image, for example the shape camera 24 or a barcode camera 26 operating in a Schlieren mode. In a next step 9032 at least one image of the returned item is obtained using the shape camera 26. In addition to, or instead of, the image obtained by the shape camera, sensor data may be obtained by the sensor 30 in step 9041.

In a next step 9051 the image obtained using the barcode camera 26 is processed. The obtained image can be processed by dividing it by the reference image on a pixel by pixel basis in order to calculate a transmission coefficient at each pixel. Alternative processing methods include subtracting the reference image from the obtained image, or any other suitable foreground-background segmentation method. The results can be used to create a processed image where each pixel is either classified as object (1, or "white") or background (0, or "black"). In this processed image, sequences of pixels with the value 1 are classified as "thin" or "normal" based on the length of the sequence across the direction of movement for returned items, and adjacent "thin" pixels are grouped together to represent "thin objects". In order to be classified as "thin" the sequence must be shorter than a threshold value. This threshold value may be a tuning parameter dependent on the configuration of the reverse vending machine and the desired sensitivity of the detection. In some cases it may be required to classify only objects that are less than one or two millimeters thick as "thin", while in other cases the designer or operator may desire to classify objects that are as thick as perhaps 10 mm or 15 mm. The threshold number of pixels must be chosen correspondingly, depending on the resolution of the images, the positions of the camera with respect to the returned items, etc. In step 9053, the position of any detected thin object is determined. The processing of steps 9051-9053 correspond to the processing of step 305 in FIG. 3.

In a next step 9061 the position of the returned item is determined based at least either an image obtained using the shape camera 24 in step 9032 or sensor data obtained in step 9041. The position of any detected thin object relative to the position of the returned item can then be established in step 9071. Additional processing may also be included in order to detect acceptable thin objects such as cap tabs. For example, the fraud confidence for a detected thin object that is classified as very likely to be a cap tab can be reduced in proportion to its "cap tab score". This cap tab score can be based on measured properties as compared with expected properties for cap tabs (or other acceptable thin objects) stored in a database or in a file.

In step 9072 the consistency of any detected thin object with the valid return of an item is determined. The consistency can be based on the position of the thin object relative to the returned item. If an inconsistency can be determined, the process follows the steps outlined in FIG. 3 from branch point 308. Different metrics for the calculation of the fraud confidence score in step 310 can be contemplated without departing from the scope of the invention. For example, the closer the thin object is to the top end of the returned item (e.g. the can or bottle opening) and the more similar its measurements is to the expected measurements of a cap tab, the lower the fraud confidence is determined to be. Other metrics may include whether the thin object changes its position relative to the returned item over time (e.g. indicating that it moves independently of the returned item), whether it appears to be attached to the returned item or not, and whether it moves toward or away from the returned item.

Figure 10:
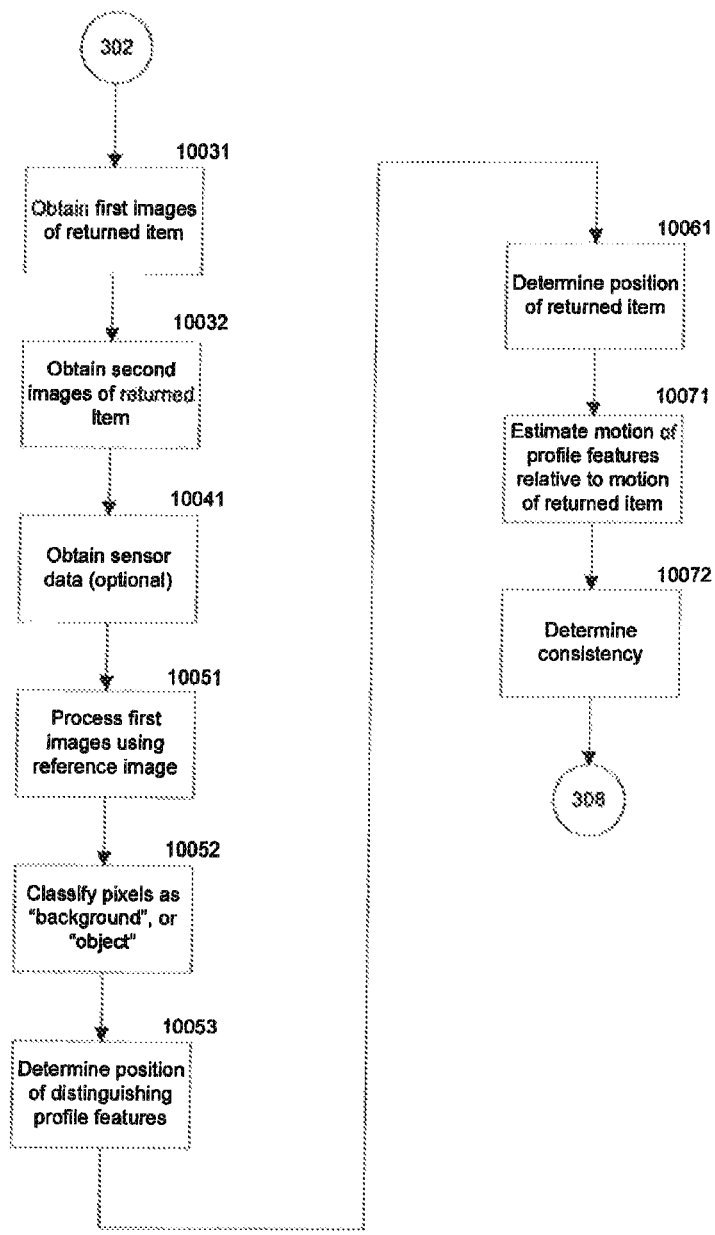
FIG. 10 is a flowchart showing in further detail some of the steps of yet another embodiment of a method according to the invention.

The embodiment illustrated in FIG. 10 is similar to the one described with reference to FIG. 9, but in this embodiment the first feature extraction algorithm searches for edges along the outline of the returned item instead of thin objects. In particular, characteristic features of the edge, such as "steps" or discontinuities are tracked. If such features move differently from the overall motion of the returned item or simply disappear from one image to the next, this may be an indication of fraudulent activity.

The initial steps are similar to those of the preceding embodiment, in that a reference image is obtained in step 301 and a returned item is inserted into the reverse vending machine in step 302 (as illustrated in FIG. 3). In step 10031 a plurality of Schlieren images are obtained using a barcode camera 26 and in step 10032 a plurality of images of the returned item are obtained using the shape camera 24. In some embodiments sensor data from sensor 30 obtained in step 10041 replaces or supplements the images obtained using the shape camera 24.

In step 10051 the images obtained in step 10031 are processed using corresponding reference images. The resulting composite image is an image where all pixels are classified as either background or object, as discussed above. The composite image is further processed in step 10053, where distinguishing features of the edge profile are detected and their positions are determined. This can for example be done by calculating the 1st derivative of the edge profile, for example by drawing a curve that traces the edge between object pixels and background pixels and calculating the 1st derivative of this curve. In step 10061 the position of the returned item is determined based on images obtained in step 10032 and/or sensor data obtained in step 10041.

In step 10071 the motion of any distinguishing features detected in step 10053 (i.e. the change in position over two or more images) are compared with corresponding changes in position for the returned item as a whole. For example, any peak in the 1st derivative should remain in the same position relative to the returned item, i.e. distinguishing features should not display any independent motion relative to the returned item or disappear. If such a distinguishing feature does move independently from the returned item or disappears, this can for example be the result of a label with a barcode being attached to a stick or a string and moved independently into the chamber 20, or it may indicate that a person is holding the returned item and reaching into the chamber 20 beyond the opening zone 12 where a user is supposed to let go and remove their hand.

If it can be determined in step 10072 that an indication of fraud may be present, i.e. that movement or loss of a distinguishing feature of the item profile is inconsistent with the normal return of a valid returnable item, the process proceeds with step 308 as described with reference to FIG. 3. The metrics used when calculating the fraud confidence level, or confidence score, may include dimensions of a distinguishing feature such as the step height where the 1st derivative has a peak, the position on the returned item, the position in the chamber such that an inconsistency that occurs near the exit of the chamber 20 is more suspicious than an inconsistency that occurs near the opening 12. Other metrics may also be contemplated without departing from the scope of the invention. Also, additional calculations may be performed in order to disregard inconsistencies that can be classified as acceptable, for example profile features that can be identified as a partly loose label.

Figure 11:
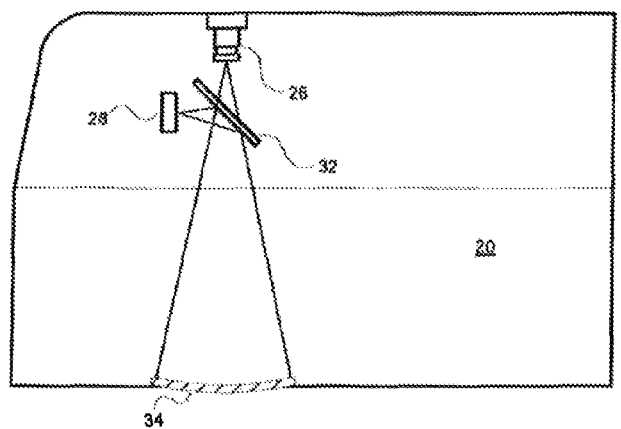
FIG. 11 is an illustration of an embodiment including a light source, a beam splitter and a retroreflector configured to allow a barcode camera to operate to detect shapes.

FIG. 11 is an illustration of an exemplary embodiment of how a barcode camera can operate in a mode that is primarily directed at detecting shapes, edges or thin objects rather than reading barcodes. According to this embodiment the barcode camera 26 is directed toward the chamber 20 as already described with reference to FIG. 2, but in front of the camera there is a beam splitter 32. A light source 28 is positioned at the same distance from the beam splitter 32 as the camera 26, such that optically speaking, as seen from the chamber 20 the light source 28 and the camera 26 are in the same position. At the far end of the chamber 20 there is a retroreflector which reflects light directly back at the camera 26. In the embodiment illustrated the retroreflector is a concave spherical mirror. However, other configurations are possible. Alternatively, a flat mirror could be used in combination with a Fresnel lens, as described in U.S. Pat. No. 5,898,169.

The result of this configuration is that the image captured by the camera 26 will show a very bright background, and any object in the image will consequently be relatively much darker. By processing the image using an empty reference image showing only the background, this effect can be further enhanced, giving the images discussed above.

Figure 12:
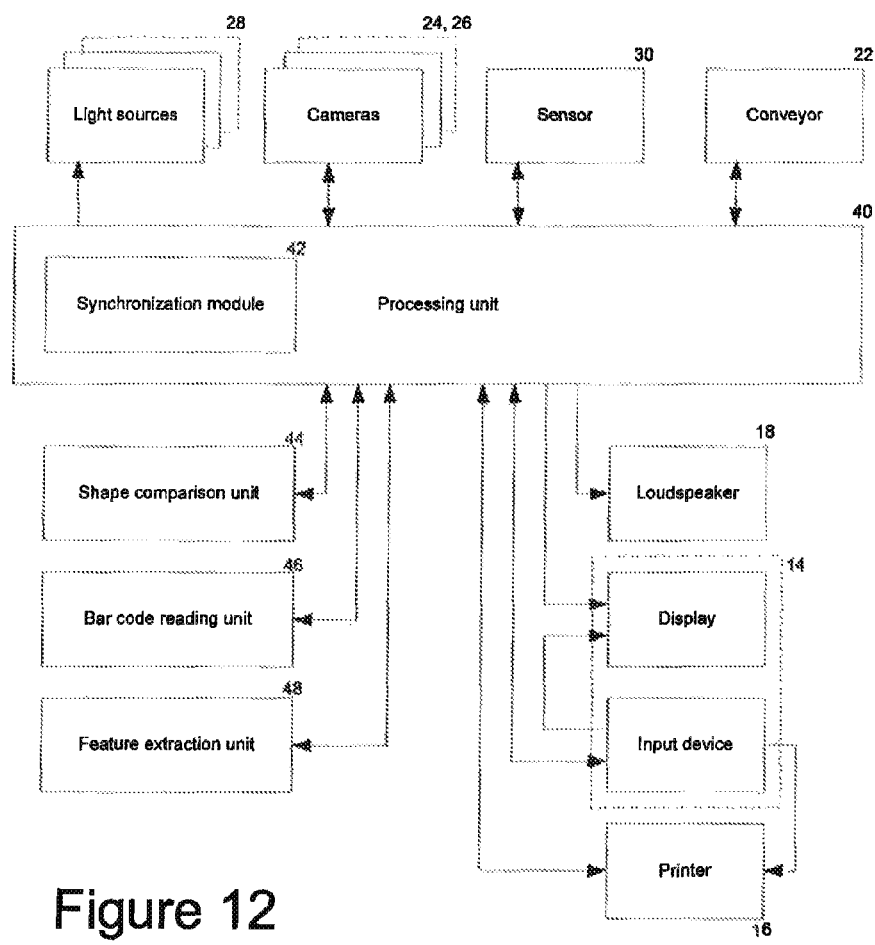
FIG. 12 is a block diagram illustrating the various components of a reverse vending machine configured to implement an embodiment of the invention.

Reference is now made to FIG. 12, which is a block diagram illustrating the various components of an exemplary embodiment of a reverse vending machine operating in accordance with the principles of the invention. A number of light sources 28 are connected to processing unit 40 which includes a synchronization module 42. The synchronization module 42 may be configured to control any required synchronized operation of the light sources 28, the cameras 24,26, the sensor 30 and the conveyor 22, such as controlling which light source 28 illuminate the chamber when a particular camera 24,26 is activated, or ensuring that two or more cameras are activated simultaneously or in a particular sequence, as dictated by any of the embodiments described above or combinations thereof. Data returned from the cameras (or other suitable light detectors or light sensors) 24,26, sensor 30 and conveyor 22 are received by the processing means 40. Further, the reverse vending machine may include a comparison module 44 configured to compare an image detected by the shape camera 24 to recognize a contour image of a particular returned item and communicating such recognition back to the processing unit 40. Input from and output to a user may be received by and controlled by the processor unit 40, respectively, through a display and input device which may be combined in a touch screen 14, a printer 16 and a loudspeaker 18.

The reverse vending machine may also include a bar code reading unit 46 and a feature extraction unit 48. Those with skill in the art will realize that the shape comparison unit 44, the bar code reading unit 46 and the feature extraction unit 48 may be implemented as software stored in a storage device (not shown) and configured to be executed by the processing unit 40. These units may also be fully or partly implemented as separate processors, graphic processors, field programmable gate arrays (FPGA), application specific integrated circuits (ASIC), or a combination thereof. Furthermore, several of the various algorithms, instructions and hardware implementing these units may operate as part of more than one such unit. For example, algorithms implemented as software modules in the bar code reading unit 46, may double as part of one or more feature extraction functions that are part of the feature extraction unit 48.

Those with skill in the art will also understand that additional components that are not illustrated in FIG. 12 may be part of a reverse vending machine or a system of reverse vending machines. Such components may, for example, include a power supply, a communication interface for communication with remote computers or storage units, various storage units including volatile and non-volatile memory units, databases etc.

The invention claimed is:

1. A method for detecting fraud attempts in a reverse vending machine, the reverse vending machine comprising at least one image sensor and at least one data processing unit, the method comprising:
   using said at least one image sensor to obtain a set of one or more images of a returned item inserted into the reverse vending machine;
   using at least one data processing unit to apply a first feature extraction algorithm to extract a first feature from at least a first subset of said set of one or more images;
   using at least one data processing unit to apply a second feature extraction algorithm to extract a second feature from i) at least a second subset of said set of one or more images or ii) data received from an additional sensor; and
   using at least one data processing unit to determine whether a position or a motion of said first feature is inconsistent with a position or motion of said second feature.

2. A method according to claim 1, wherein said second feature extraction algorithm is applied to data received from an ultrasonic sensing device included in said reverse vending machine.

3. A method according to claim 1, wherein said second feature extraction algorithm is applied to data received from a laser ranging device included in said reverse vending machine.

4. The method of claim 1, wherein:
   obtaining said set of one or more images includes obtaining at least two images obtained at at least two different points in time.

5. The method of claim 4, wherein:
   said first feature extraction algorithm is used to extract a feature from an image obtained at a first point in time, said feature being indicative of a relative position of an object at said first point in time; said second feature extraction algorithm is used to extract a feature from an image obtained at a second point in time, said feature being indicative of a relative position of said object at said second point in time; and said determining includes estimating a velocity of said object based on said relative positions and the time interval between said first and second point in time, and comparing said estimated velocity with an expected velocity.

6. The method of claim 5, wherein said expected velocity is any velocity which is positive relative to the direction a returnable item normally travels through the reverse vending machine, and said determining indicates inconsistent motion if said estimated velocity is a velocity which is negative relative to the direction a returnable item normally travels through the reverse vending machine.

7. The method of claim 5, wherein said expected velocity is based on the velocity at which a conveyor arranged to transport returned items through said reverse vending machine is operating, and said determining indicates inconsistent motion if said estimated velocity is substantially different from said expected velocity.

8. The method of claim 5, wherein said expected velocity is based on a determined estimated velocity resulting from the application of said first feature extraction, said second feature extraction and said determining on a previous set of images, and the method further comprises using the result of said determining to update the expected velocity prior to the application of said first feature extraction, said second feature extraction and said determining on a subsequent set of images.

9. The method of claim 5, wherein:
said first feature extraction algorithm includes applying edge detection along two axes and, based on said edge detection, identifying a region of interest in said first image; and
said second feature extraction algorithm includes searching for a region in said second image which is highly correlated with said region of interest in said first image.

10. The method of claim 9, wherein said first image is obtained at a current point in time and said second image is obtained at a previous point in time.

11. The method of claim 1, wherein:
said first feature extraction algorithm is used to extract a first feature indicative of a relative position of a first object associated with said first feature from at least two images obtained at at least two different points in time;
said second feature extraction algorithm is used to extract a second feature indicative of a relative position of a second object associated with said second feature from at least two images obtained at at least two different points in time; and
said determining includes estimating relative velocities for said first and said second object based on said relative positions and time intervals between the different points in time, and indicating an inconsistent motion of said first object relative to said second object if there is a substantial difference between said first and said second estimated velocity.

12. The method of claim 11, wherein said first feature extraction algorithm is applied to images obtained from a first image sensor and said second feature extraction algorithm is applied to images obtained from a second image sensor, and where said first feature is representative of a barcode and said second feature is representative of a shape of a returned item.

13. The method of claim 1, wherein:
said first feature extraction algorithm includes detecting the presence and position of a thin object in at least one image from said first subset of images;
said second feature extraction algorithm includes detecting a position of a returned item from at least one image from said second subset of images or from said sensor data; and
said determining includes comparing the position of the detected thin object relative to the position of the returned item.

14. The method of claim 13, wherein detecting the presence and position of a thin object includes using a foreground-background segmentation method to generate a processed image, classifying each pixel in said processed image as either an object pixel or a background pixel, and classifying each object pixel as either "normal" or "thin".

15. The method of claim 14, wherein said foreground-background segmentation method includes dividing a current image by a reference image.

16. The method of claim 1, wherein:
said first feature extraction algorithm includes detecting the presence and position of at least one characteristic feature of the shape of a returned item from at least two images in said first set of images, said at least two images being obtained at different points in time;
said second feature extraction algorithm includes detecting a position of a returned item from at least two images from said second subset of images or from said sensor data; and
said determining indicates an inconsistency if said characteristic feature has a relative position with respect to the overall shape of the returned item which differs substantially in said at least two images from said first set of images.

17. The method of claim 16, wherein detecting the presence and position of at least one characteristic feature of the shape of a returned item includes using a foreground-background segmentation method to generate a processed image, classifying each pixel in said processed image as either an object pixel or a background pixel, and detecting a feature as a peak in the 1st derivative of a curve tracing the edge between object pixels and background pixels.

18. The method of claim 17, wherein said foreground-background segmentation method includes dividing a current image by a reference image.

19. The method of claim 13, wherein said first subset of images are obtained using an image sensor which is configured to view a returned item silhouetted against a background including a retroreflector, and where a light source and a beam splitter are configured such that said light source and said image sensor are optically co-located as seen from the retroreflector.

20. A reverse vending machine with an opening through which items can be inserted into the interior of said machine, at least one image sensor configured to obtain images of at least a part of an inserted item, and at least one data processing unit, the reverse vending machine comprising: at least one data processing unit configured to receive a set of one or more images of a returned item inserted into the reverse vending machine from said at least one image sensor;
at least one feature extraction unit configured to apply a first feature extraction algorithm to extract a first feature from at least a first subset of said set of one or more images and apply a second feature extraction algorithm to extract a second feature from i) at least a second subset of said set of one or more images, or ii) data received by said at least one data processing unit from an additional sensor; and at least one data processing unit configured to determine whether a position or a motion of said first feature is inconsistent with a position or a motion of said second feature.

21. The reverse vending machine of claim 20, further comprising an ultrasonic sensor configured to obtain sensor data from inside said interior and provide said data to said at least one data processing unit; and wherein said feature extraction unit is configured to apply said second feature extraction algorithm to data received from said ultrasonic sensor.

22. The reverse vending machine of claim 20, further comprising a laser ranging device configured to obtain sensor data from inside said interior and provide said data to said at least one data processing unit; and wherein said feature extraction unit is configured to apply said second feature extraction algorithm to data received from said laser ranging device.

23. The reverse vending machine of claim 20, wherein said at least one data processing unit is configured to control said at least one image sensor to obtain images at at least two different points in time.

24. The reverse vending machine of claim 23, wherein said at least one feature extraction unit is configured to apply said first feature extraction algorithm to an image obtained at a first point in time and to apply said second feature extraction algorithm to an image obtained at a second point in time; and
said at least one data processing unit is configured to estimate a velocity of an object present in said interior based on the relative positions of said first and said second features, and to compare said estimated velocity with an expected velocity.

25. The reverse vending machine of claim 23, wherein said at least one feature extraction unit is configured to apply said first feature extraction algorithm and said second feature extraction algorithm to images obtained at at least two different points in time; and
said at least one data processing unit is configured to estimate relative velocities for a first and a second object associated with said first and said second feature, respectively, and to indicate an inconsistent motion of said first object relative to said second object if there is a substantial difference between said first and said second estimated velocity.

26. The reverse vending machine of claim 25, wherein said at least one image sensor includes at least one first image sensor with a relatively narrow field of view in order to capture images of barcodes attached to returned items at least partly present in said interior, and at least one second image sensor with a relatively wide field of view in order to capture images of the shape of returned items at least partly present in said interior.

27. The reverse vending machine of claim 20, further comprising:
a retroreflector, a beam splitter and a light source; and
wherein at least one image sensor is configured to view a returned object silhouetted against said retroreflector, and said light source and said beam splitter are configured such that said light source and said image sensor are optically co-located as seen from the retroreflector.

28. The reverse vending machine of claim 20, wherein the feature extraction unit comprises one or more components chosen from the group consisting of: a set of computer program instructions stored on a storage device and configured to enable the at least one data processing unit to perform feature extraction functions, a field programmable gate array (FPGA), and an application specific integrated circuit (ASIC).

* * * * *